(12) United States Patent
Hurley

(10) Patent No.: US 7,680,386 B2
(45) Date of Patent: Mar. 16, 2010

(54) RETRACTABLE MODULE FOR PATCH CORDS

(75) Inventor: William C. Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/220,289

(22) Filed: Jul. 23, 2008

(65) Prior Publication Data

US 2010/0021122 A1      Jan. 28, 2010

(51) Int. Cl.
    *G02B 6/00* (2006.01)
(52) U.S. Cl. .................. 385/135; 385/134; 385/136; 385/137
(58) Field of Classification Search .................. 385/135
    See application file for complete search history.

(56) References Cited

U.S. PATENT DOCUMENTS

| | | | | |
|---|---|---|---|---|
| 4,722,585 | A * | 2/1988 | Boyer ..................... | 385/135 |
| 5,013,121 | A | 5/1991 | Anton et al. ............... | 350/96.2 |
| 5,066,149 | A | 11/1991 | Wheeler et al. ............ | 385/135 |
| 5,078,466 | A | 1/1992 | MacCulloch ............... | 385/26 |
| 5,243,679 | A * | 9/1993 | Sharrow et al. ........... | 385/135 |
| 5,703,990 | A * | 12/1997 | Robertson et al. ......... | 385/135 |
| 6,038,362 | A * | 3/2000 | Toyoda et al. .............. | 385/137 |
| 6,201,923 | B1 * | 3/2001 | Yuhara et al. .............. | 385/137 |
| 6,215,938 | B1 | 4/2001 | Reitmeier et al. .......... | 385/135 |
| 6,269,213 | B1 * | 7/2001 | Ohta et al. ................. | 385/135 |
| 6,328,243 | B1 | 12/2001 | Yamamoto ............... | 242/378.1 |
| 6,408,124 | B1 | 6/2002 | Holman et al. ............. | 385/135 |
| 6,416,005 | B1 * | 7/2002 | Liao ........................ | 242/378.1 |
| 6,456,773 | B1 * | 9/2002 | Keys ......................... | 385/135 |
| 6,484,958 | B1 * | 11/2002 | Xue et al. ................ | 242/378.1 |
| 6,625,374 | B2 | 9/2003 | Holman et al. ............. | 385/135 |
| 6,741,784 | B1 | 5/2004 | Guan ........................ | 385/135 |
| 6,803,525 | B1 * | 10/2004 | Liao ........................ | 174/135 |
| 6,819,857 | B2 | 11/2004 | Douglas et al. ............ | 385/135 |
| 6,873,778 | B2 * | 3/2005 | Tsai et al. .................. | 385/135 |
| 6,915,058 | B2 * | 7/2005 | Pons ......................... | 385/135 |
| 7,065,282 | B2 * | 6/2006 | Sasaki et al. ............... | 385/135 |
| 7,116,883 | B2 * | 10/2006 | Kline et al. ................ | 385/135 |
| 7,120,349 | B2 | 10/2006 | Elliott ...................... | 385/137 |
| 7,229,042 | B2 * | 6/2007 | Thebault et al. ......... | 242/388.1 |
| 7,266,283 | B2 * | 9/2007 | Kline et al. ............... | 385/137 |
| 7,315,681 | B2 * | 1/2008 | Kewitsch .................. | 385/135 |
| 2008/0118207 | A1 * | 5/2008 | Yamamoto et al. ......... | 385/88 |

* cited by examiner

*Primary Examiner*—Frank G Font
*Assistant Examiner*—Ryan Lepisto
(74) *Attorney, Agent, or Firm*—John H. Vynalek

(57) ABSTRACT

A retractable optical fiber assembly is provided, including a first ring adapted to accommodate a first winding of a fiber optic cable having a first end. A second ring is positioned concentrically with the first ring. The second ring is rotatable with respect to the first ring, and the second ring is adapted to accommodate a second winding of the fiber optic cable having a second end. Rotating the second ring in a first direction causes the fiber optic cable to wind onto the second ring thereby retracting the second end towards the retractable optical fiber assembly, and causes the fiber optic cable to unwind about the first ring thereby retaining the first end in a stable position as the second end is retracted. A module is also provided that includes a plurality of retractable optical fiber assemblies.

37 Claims, 7 Drawing Sheets

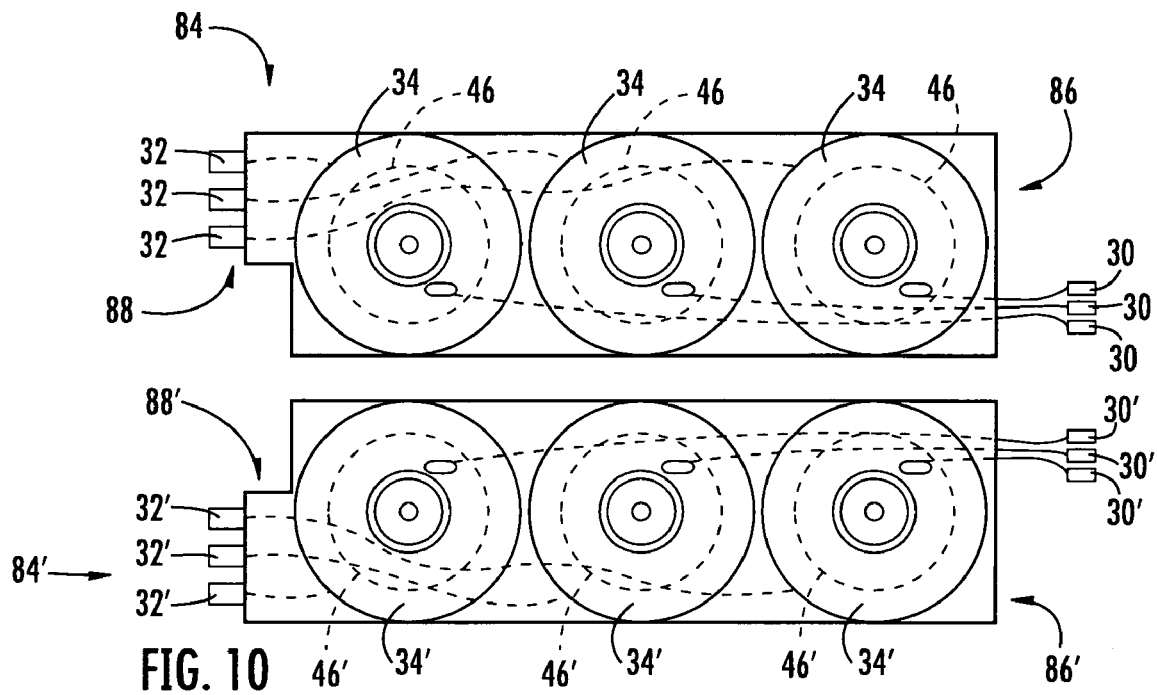
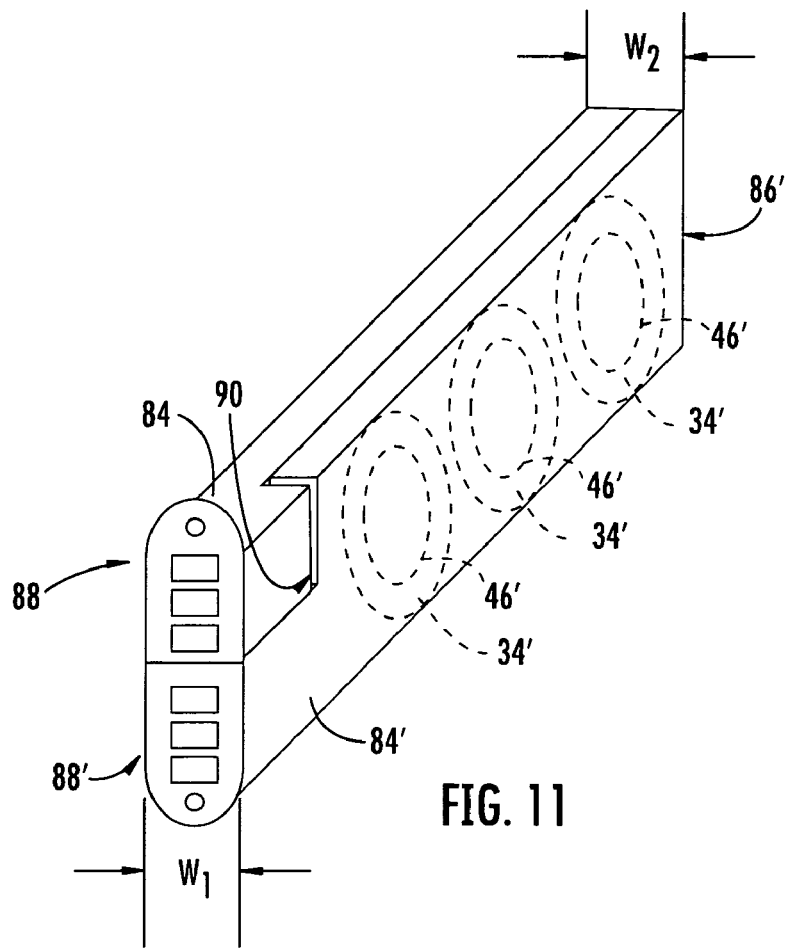
FIG. 10
FIG. 11

RETRACTABLE MODULE FOR PATCH CORDS

BACKGROUND OF THE INVENTION

1. Field of the Invention

The present invention relates generally to a retractable optical fiber assembly, and more particularly, to a retractable optical fiber assembly adapted to maintain a first end of a fiber optic cable in a stable position while a second end of the fiber optic cable is selectively extendable.

2. Technical Background

Fiber optic cables are used to transmit telecommunication, television, and computer data information in various environments. For example, in a local area network, fiber optic cables may extend from a server to work stations in various rooms or cubicles within an office. If the office is to be moved, the fiber optic cable must normally be rewired in the new facility. Rewiring may be required even when cubicles are rearranged. Fiber optic cables are also utilized for interconnecting main telecommunication closets to temporary or satellite closets. Other occasions arise when fiber optic cable is temporarily deployed, such as for special events, trade shows, broadcasts and conferences. Fiber optic cable is expensive and it would be desirable to be able to reuse the cable after such usage.

Conventional fiber optic storage reels are available to store excess lengths of fiber optic cables in optical network enclosures, such as splice trays, distribution boxes, cross-connect cabinets, and splice closures. However, conventional fiber optic storage reels are primarily intended for storing relatively short lengths of fiber optic cables. Fiber optic storage reels are also available in which the fiber optic cable is coiled on the reel in such a manner that the ends of the cable can be unwound from the reel at the same time and in the same direction. One such fiber optic storage reel includes an S-shaped or teardrop-shaped channel that receives the optical cable and reverses the direction of travel of one end, while maintaining the minimum bend radius of the optical waveguide. However, the known fiber optic storage reels do not provide adequate means for protecting and storing relatively long lengths of fiber optic cable within a manageable size assembly.

SUMMARY OF THE INVENTION

In one example aspect, a retractable optical fiber assembly is provided, includes a base having a first ring and a spool having a second ring. The spool is rotatable with respect to the base. A length of fiber optic cable includes a first end, a second end, and an intermediate location. The fiber optic cable includes a first cable portion defined between the first end and the intermediate location, and a second cable portion defined between the second end and the intermediate location. The intermediate location is coupled to the spool. Rotation of the spool with respect to the base in a first direction causes the first cable portion to unwind about the first ring, while the second cable portion winds onto the second ring.

In another example aspect, a retractable optical fiber assembly is provided, including a base having a first ring, a side wall, and first and second base passages. A spool has a second ring and a ring passage, and the spool is rotatable with respect to the base. A length of fiber optic cable is coiled onto the second ring and includes a first end, a second end, and an intermediate location. The fiber optic cable includes a first cable portion defined between the first end and the intermediate location, and a second cable portion defined between the second end and the intermediate location. The first base passage provides communication between an area between the first and second rings and an exterior of the base, the second base passage provides communication between an interior of the base and the exterior of the base, and the ring passage provides communication between the area between the first and second rings and the interior of the base. The first cable portion is threaded through the first base passage with a length of the first cable portion configured to be disposed in the area between the first and second rings, the second cable portion is threaded through the second base passage with a length of the second cable portion configured to be disposed in the interior of the base, and the intermediate location is secured to the spool with respect to the ring passage.

In another example aspect, a retractable optical fiber assembly is provided, including a base having a first ring defining a first circumference. A spool has a second ring defining a second circumference, and the spool is rotatable with respect to the base. A length of fiber optic cable includes a first cable portion defining a first predetermined length of cable adapted to be wound about the first ring, and a second cable portion defining a second predetermined length of cable adapted to be wound about the second ring. A ring ratio is defined as the second circumference divided by the first circumference, and a length ratio is defined as the second predetermined length divided by the first predetermined length. The ring ratio is equal to or greater than the length ratio.

In yet another example aspect, a module is provided that includes a plurality of retractable optical fiber assemblies. The module includes a plurality of bases, each base having a first ring, and a plurality of spools each having a second ring. Each of the plurality of spools is rotatable with respect to a respective one of the plurality of bases. A plurality of fiber optic cables each includes a first cable portion and a second cable portion, wherein each of the plurality of fiber optic cables is associated with a respective one of the plurality of spools. Rotation of a selected one of the plurality of spools in a first direction with respect to an associated base causes the first cable portion of the associated fiber optic cable to unwind about an associated first ring, while the second cable portion of the associated fiber optic cable winds onto the second ring of the selected one of the plurality of spools.

In yet another example aspect, a retractable optical fiber assembly is provided, including a first ring adapted to accommodate a first winding of a fiber optic cable having a first end. A second ring is positioned concentrically with the first ring. The second ring is rotatable with respect to the first ring, and the second ring is adapted to accommodate a second winding of the fiber optic cable having a second end. Rotating the second ring in a first direction causes the fiber optic cable to wind onto the second ring thereby retracting the second end towards the retractable optical fiber assembly, and causes the fiber optic cable to unwind about the first ring thereby retaining the first end in a stable position as the second end is retracted.

BRIEF DESCRIPTION OF THE DRAWINGS

These and other features, aspects and advantages of the present invention are better understood when the following detailed description of the invention is read with reference to the accompanying drawings, in which:

FIG. 10 illustrates a pair of example modules each containing a plurality of retractable optical fiber assemblies according to another aspect of the present invention;

FIG. 11 is similar to FIG. 10, but shows the pair of modules in a nested configuration.

DETAILED DESCRIPTION OF THE INVENTION

Figure 1:
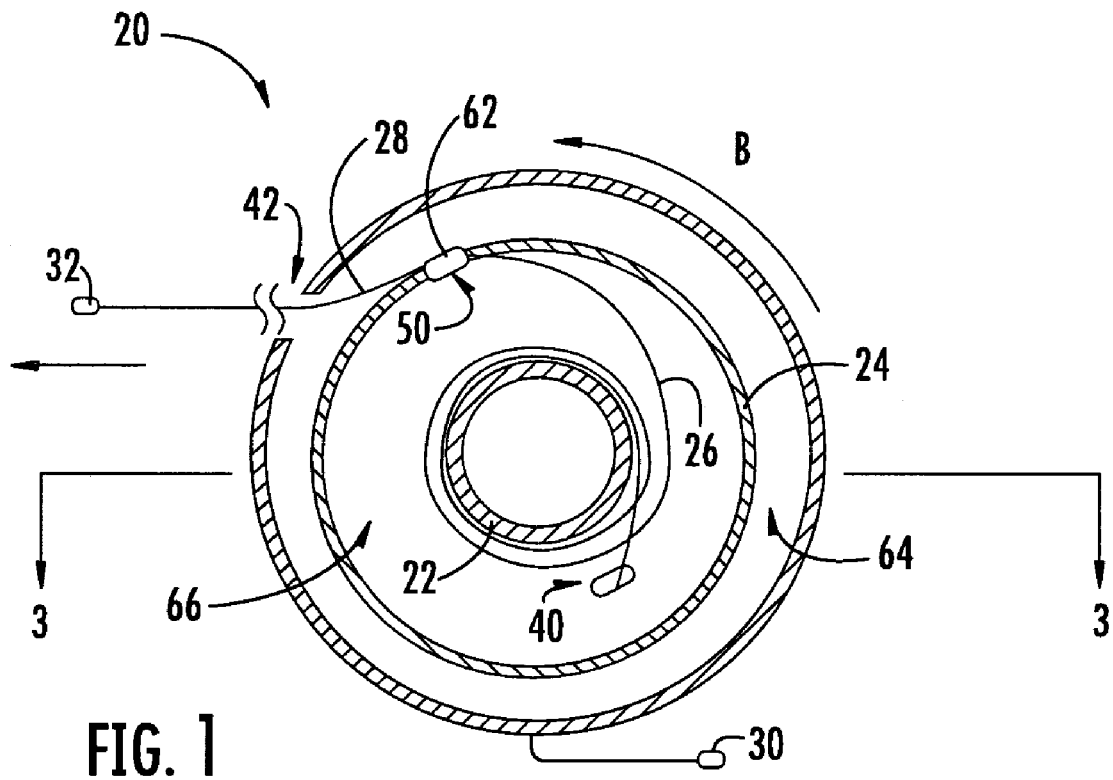
FIG. 1 illustrates a side cross section of a retractable optical fiber assembly with a length of fiber optic cable in an extended position according to an aspect of the present invention.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Referring now to FIG. 1, an example retractable optical fiber assembly 20 according to one aspect of the present invention will be described. The retractable optical fiber assembly 20 can include a first ring 22 and a second ring 24 positioned generally concentrically with the first ring 22. The first ring 22 can be adapted to accommodate a first winding 26 of a fiber optic cable including a first end 30, while the second ring 24 can be adapted to accommodate a second winding 28 of the fiber optic cable including a second end 32.

Figure 2:
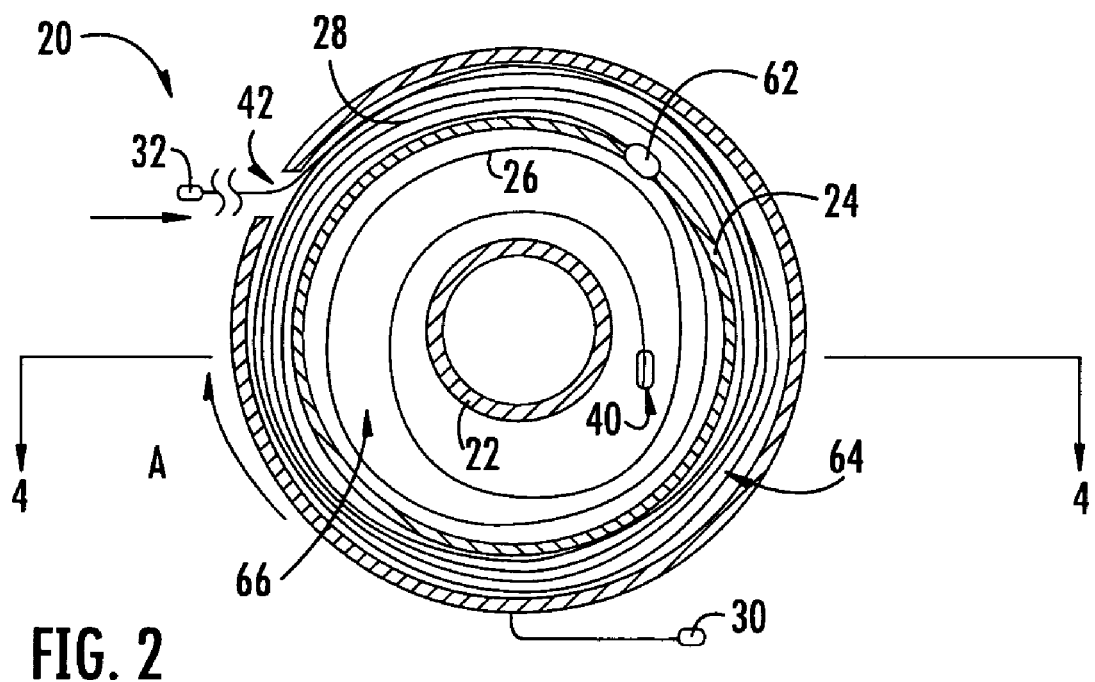
FIG. 2 is similar to FIG. 1, but shows the length of fiber optic cable in a retracted position.

The second ring 24 is rotatable with respect to the first ring 22. As will be discussed more fully herein, rotating the second ring 24 in a first direction A, as shown in FIG. 2, can cause the second winding 28 of the fiber optic cable to wind onto the second ring 24 thereby retracting the second end 32 towards the retractable optical fiber assembly 20. Additionally, rotating the second ring 24 in the first direction A can also cause the first winding 26 to unwind about the first ring 22 thereby retaining the first end 30 in a generally stable position as the second end 32 is retracted. In other words, rotation of the second ring 24 in the first direction A can cause the second end 32 of the fiber optic cable to move towards the retractable optical fiber assembly 20 (i.e., towards a retracted position) while maintaining the position of the first end 30 relative to the retractable optical fiber assembly 20.

Conversely, rotating the second ring 24 in a second direction B (i.e., generally opposite to the direction A), as shown in FIG. 1, can cause the second winding 28 of the fiber optic cable to unwind about the second ring 24 thereby extending the second end 32 from the retractable optical fiber assembly 20. Rotating the second ring 24 in the second direction B can also cause the first winding 26 to wind onto the first ring 22 thereby retaining the first end 30 in a generally stable position as the second end 32 is extended. As a result, the first end 30 of the fiber optic cable can remain optically connected to a fiber optic network or the like while the second end 32 is movable (i.e., retracted or extended) relative thereto.

As used herein, the phrase "wind" is intended to mean that the fiber optic cable has a generally curved, circular, and/or spiral course or direction to coil or twine about an object. In other words, the fiber optic cable generally tightens about an object so as to generally decrease in circumference towards a coiled condition. However, where an amount of fiber optic cable is wound about an object, the overall circumference of the fiber optic cable relative to the object may increase due to a stacking effect. The fiber optic cable may also generally increase in tension. Conversely, the phrase "unwind" is intended to mean that the fiber optic cable has a generally curved, circular, and/or spiral course or direction to uncoil or untwine about an object. In other words, the fiber optic cable generally loosens from an object so as to generally increase in circumference away from a coiled condition. The fiber optic cable may also generally decrease in tension. Moreover, a portion of the fiber optic cable may or may not contact the object about which it winds or unwinds.

The fiber optic cable generally includes a cable core section and a jacket section, though it can also include various other elements, layers, etc. The fiber optic cable can include connectorized and/or pre-connectorized optical fibers. Although the term pre-connectorized is generally used with reference to a fiber optic drop cable, pre-connectorized refers generally to a connector already being attached to the end of the optical fiber, i.e., already connectorized, when the optical fiber is ready for connection to the optical connection terminals or connector receptacle. As such, the term connectorized should be interpreted to include the term pre-connectorized.

Various types of fiber optic cables can be utilized, including single fiber or multi-fiber cables. The various fiber optic cables can include various structures or elements, including various jacket types, strength members, armor layers, tape layers, Aramid strength members, etc. Moreover, the various fiber optic cables can be connectorized so as to be capable of connecting to various other fiber optic cables, terminal panels, etc., and/or may include structure to facilitate connectorization. It is to be understood that the various geometries, structure, etc. of the fiber optic cables should facilitate the winding or unwinding of the cable with respect to the retractable optical fiber assembly 20.

Figure 3:
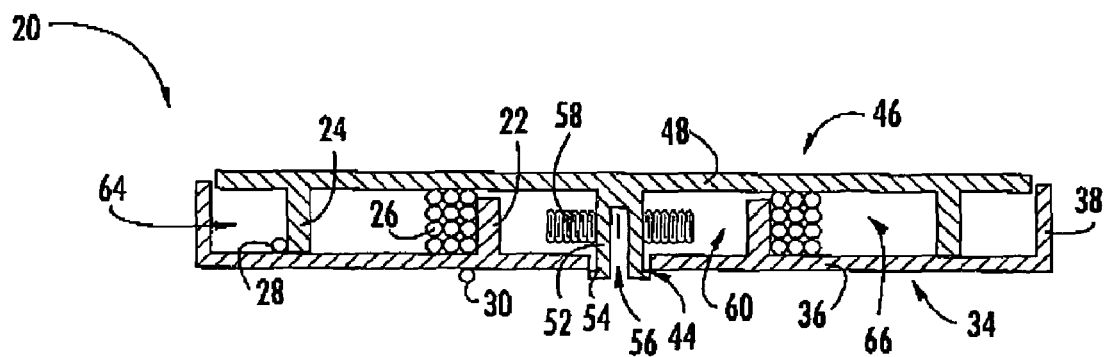
FIG. 3 illustrates a cross section taken along line 3-3 of FIG. 1.
Figure 4:
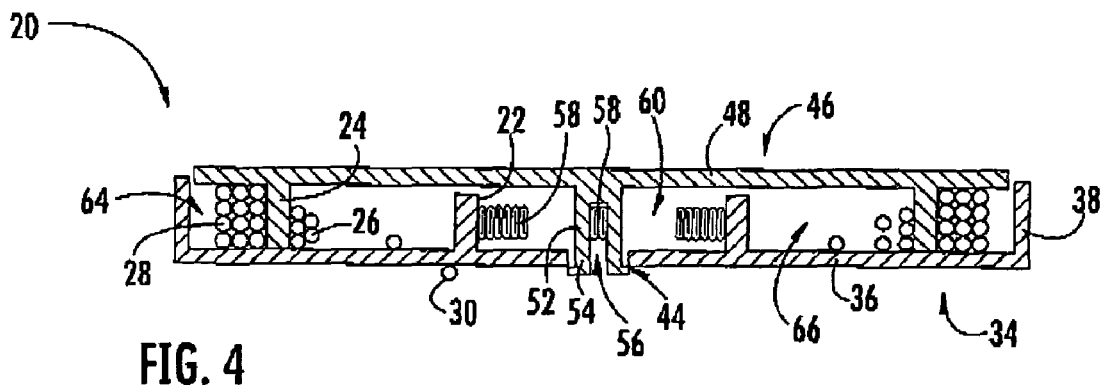
FIG. 4 illustrates a cross section taken along line 4-4 of FIG. 2.
Figure 5:
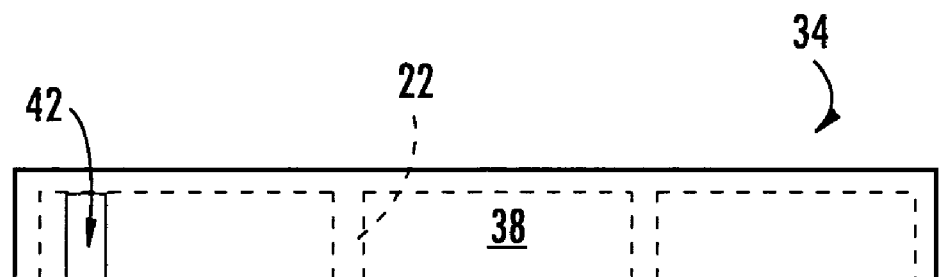
FIG. 5 illustrates a top view of an example base according to another aspect of the present invention.
Figure 6:
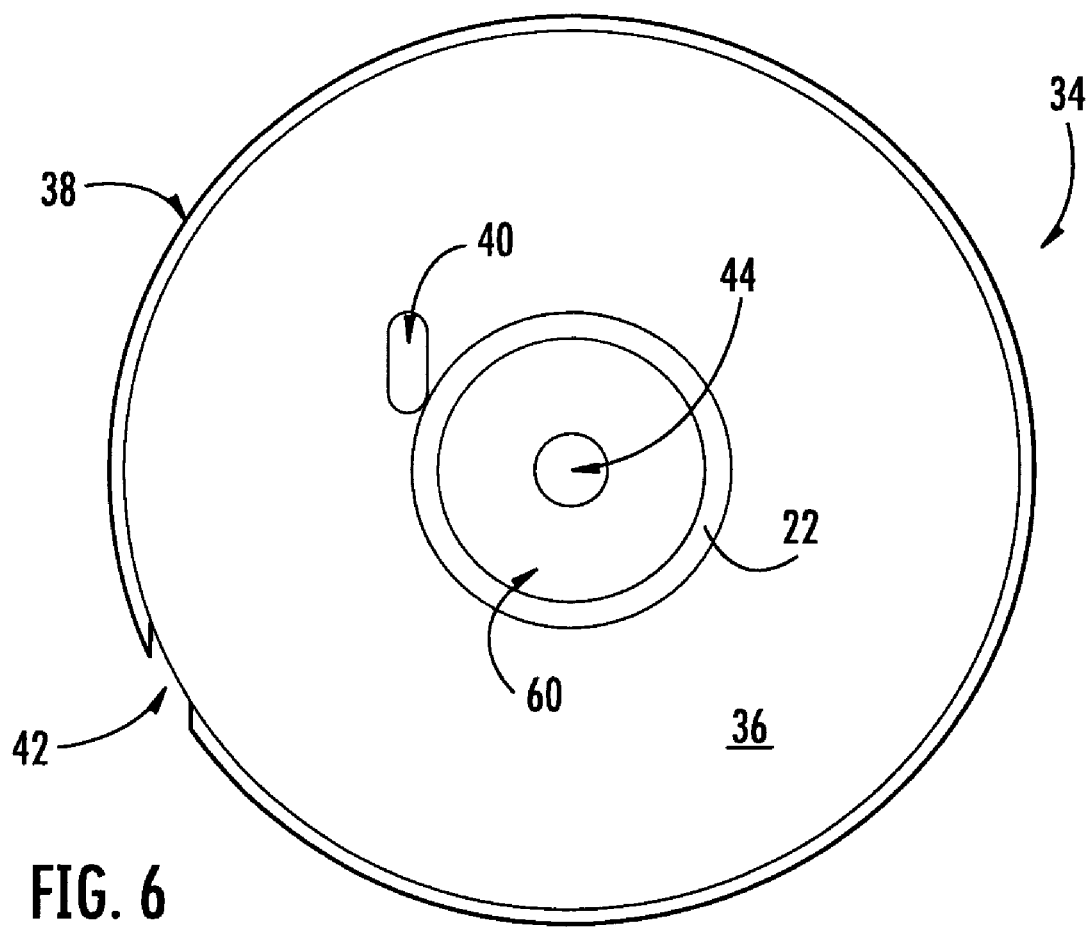
FIG. 6 illustrates a side view of the base of FIG. 5.

Referring now to FIGS. 1-4, the retractable optical fiber assembly 20 will now be described in greater detail. The assembly 20 can generally include a base 34 having the first ring 22 coupled thereto, and may further include a side wall 36 or the like. Either or both of the first ring 22 and the side wall 36 can be coupled to or even formed with the base 34. In addition or alternatively, the base 34 can also include a circumferential wall 38 coupled to or formed with a portion of the side wall 36 to provide an outer boundary for the base 34, such as to at least partially circumscribe the second ring 24 to protect a portion of the fiber optic cable, or the like. In one example, both of the first ring 22 and the circumferential wall 38 can be formed with a portion of the side wall 36 and can extend a distance therefrom at various angles, such as perpendicular. Moreover, as shown in FIGS. 5-6, either or both of the side wall 36 and the circumferential wall 38 can extend about a portion of the base 34, such as generally about a peripheral edge thereof. Further, the base 34 can include various passages having various geometries for the fiber optic cable, such as a first base passage 40 extending through a portion of the side wall 36 and a second base passage 42 extending though a portion of the circumferential wall 38. Still, the base 34 can include various other passages having various geometries, such as a central aperture 44 or the like, as will be discussed more fully herein.

Figure 7:
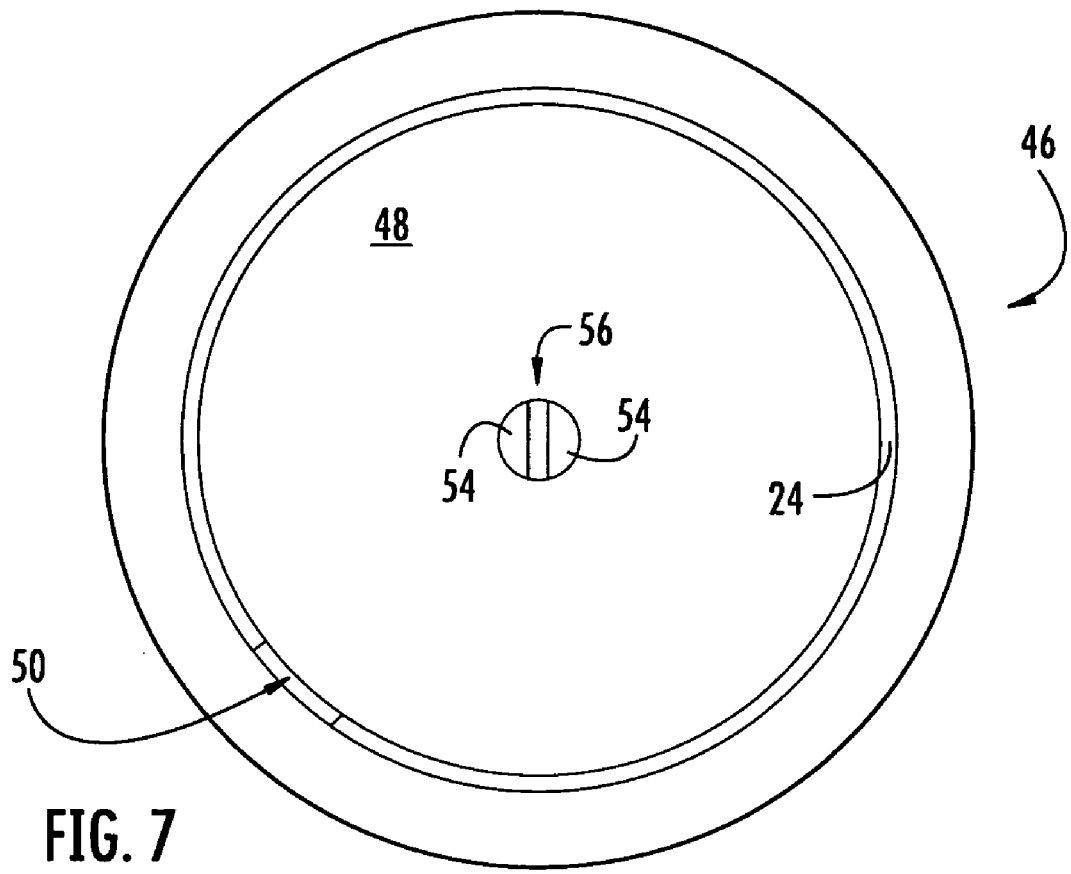
FIG. 7 illustrates a side view of an example spool according to another aspect of the present invention.
Figure 8:
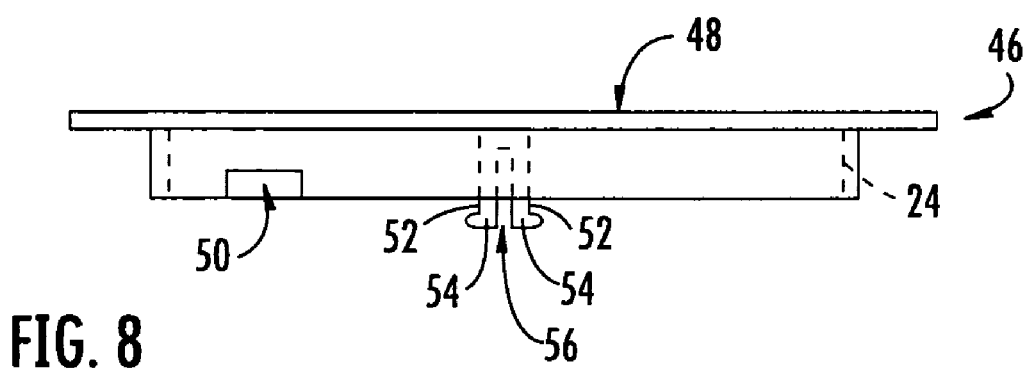
FIG. 8 illustrates a top view of the spool of FIG. 7.

The assembly 20 can also generally include a spool 46 having the second ring 24 coupled thereto, and may further include a side wall 48 and/or a circumferential wall (not shown) or the like. As shown in FIGS. 7-8, either or both of the second ring 24 and the side wall 48 can be coupled to or even formed with the spool 46. Similar to the first ring 22, the second ring 24 can be formed with a portion of the side wall 48 of the spool 46 and can extend a distance therefrom at various angles, such as perpendicular. Moreover, the side wall 48 can extend about a portion of the spool 46, such as generally about a peripheral edge thereof. Further, the spool 46 can include various passages having various geometries for the fiber optic cable, such as a ring passage 50 extending through a portion of the second ring 24.

The spool 46 is adapted to be rotatable with respect to the base 34. In one example, as shown in FIGS. 3-4, the spool 46 can be arrange generally concentrically with the base 34 and can include structure that rotatably cooperates with the central aperture 44 of the base 34. For example, the spool 46 can include a projection, such as one or more arms 52 that are adapted to be received by the central aperture 44. At least a portion of one of the arms 52 can be resilient with respect to the spool 46 so as to permit an oversized portion (e.g., relative to the central aperture 44), such as an oversized end 54, to be received by the central aperture 44. For example, by providing a gap 56 between the arms 52, the at least one resilient arm 52 can be temporarily angularly displaced relative to another of the arms 52 to permit the oversized end 54 to be received by the central aperture 44. The oversized end 54 can provide a shoulder or the like having a relatively larger dimension, such as a relatively larger diameter, than that of the central aperture 44 to inhibit removal of the arms 52 therefrom to keep the spool 46 coupled to the base 34.

Thus, where one of the arms 52 is a resilient arm with an oversized end 54, the spool 46 can be coupled to the base 34 by a snap-fit engagement. Alternatively, to release the spool 46 from the base 34, at least one of the resilient arms 52 can be pressed towards another of the arms 52 until the oversized ends 54 can be received through the central aperture 44. Upon the coupling the spool 46 to the base 34, the spool 46 can be rotatable with respect to the base 34 about the arms 52.

It is to be understood that the base 34 and spool 46 can include various materials, sizes, geometries, etc. For example, either of both of the base 34 and spool 46 can include a generally rigid material, such as metal, plastic, rubber, etc. Moreover, either of both of the base 34 and spool 46 can be formed from various manufacturing processes, including an assembly of parts, or can even be molded as a monolithic element. Further, although illustrated as having a generally circular geometry, either of both of the base 34 and spool 46 can have various other similar or dissimilar geometries, relative sizes, etc.

In addition or alternatively, the spool 46 can be rotatably coupled to the base 34 in various other manners. For example, the spool 46 can include a generally rigid projection (not shown) that is adapted to be received by the central aperture 44, and retained therein by a mechanical fastener, resilient projection, corresponding structure of the base 34, etc. Moreover, a bushing, bearing, lubricant, or the like (not shown) can be located between the spool 46 and the base 34 to facilitate rotation. Similarly, structure (not shown) can also be located between the spool 46 and the base 34 to inhibit rotation, such as after a predetermined relative rotational amount (e.g., after 360 or 720 degrees of rotation, or even various other angles, etc.).

A resilient member 58 can also be positioned between the base 34 and the spool 46 to bias the spool 46 towards a relative rotational direction, such as clockwise or counter-clockwise. For example, the resilient member 58 can bias the spool 46 towards retraction or extension of the fiber optic cable wound thereon. In one example, the resilient member 58 can include a spiral spring, though various other springs or the like can also be used. As shown in FIGS. 3-4, the resilient member 58 can be located within an area 60 bounded by the first ring 22, and may be coupled to a portion of the base 34, such as the first ring 22 and/or the side wall 36. Further, the resilient member 58 can also be coupled to a portion of the spool 46, such as to the arms 52 and/or the side wall 48. In one example, a portion of the resilient member 58 can be positioned in the gap 56 between a pair of arms 52. Additionally, it is to be understood that the resilient member 58 can also be adapted to limit rotation of the spool 46 relative to the base 34. For example, where a spiral spring is used, rotation of the spool 46 can be limited by the relative sizes and geometry of the spiral spring, the area 60, and/or the arms 52 such that the spiral spring may "bottom out" such that it cannot compress any further (e.g., see FIG. 3) after a predetermined amount of rotation of the spool 46.

The retractable optical fiber assembly 20 can further include a length of fiber optic cable including the first end 30, the second end 32, and an intermediate location 62 positioned between the first and second ends 30, 32. Thus, the fiber optic cable can define a first portion or winding 26 between the first end 30 and the intermediate location 62, and a second portion or winding 28 between the second end 32 and the intermediate location 62. The first and second windings 26, 28 can have various relative lengths. In one example, the first and second windings 26, 28 can have generally equal lengths. In another example, the second winding 28 can be greater than the first winding 26. As will be discussed more fully herein, a ratio of the lengths of the first and second windings 26, 28 can be adjusted to accommodate the various geometries of the retractable optical fiber assembly 20, including the various geometries, sizes, etc. of the fiber optic cable.

Generally, the retractable optical fiber assembly 20 is adapted to permit selective extension and/or retraction of the second end 32 of the fiber optic cable, while maintaining the first end 30 in a stable position. As a result, the first end 30 of the fiber optic cable can remain optically connected to a fiber optic network, terminal panel, or the like while the second end 32 is movable (i.e., retracted or extended) relative thereto.

To accomplish this, the first and second windings 26, 28 are provided in a "counter-coil" arrangement, wherein one of the windings winds onto its respective ring while the other winding unwinds about its respective ring. In other words, the first and second windings 26, 28 wind in opposite directions. Specifically, the first winding 26 of the fiber optic cable is adapted to be wound or unwound about the first ring 22, while the second winding 28 of the fiber optic cable is adapted to be wound or unwound about the second ring 24. Thus, rotating the second ring 24 in a first direction A, as shown in FIGS. 2 and 4, causes the second winding 28 of the fiber optic cable to wind onto the second ring 24 thereby retracting the second end 32 towards the retractable optical fiber assembly 20. As the second end 32 retracts inwards via the second base passage 42, the second winding 28 is disposed in an interior 64 of the base 34 defined between the second ring 24 and the circumferential wall 38.

At the same time, the first winding 26 unwinds about the first ring 22, thereby retaining the first end 30 in a generally stable position as the second end 32 is retracted. The first winding 26 is disposed in an area 66 defined between the first and second rings 22, 24, and generally winds and unwinds within the area 66. For example, the first winding 26 tends to expand within the area 66 generally towards an interior surface of the second ring 24 as it unwinds about the first ring 22. In other words, rotation of the second ring 24 in the first direction A causes the second end 32 of the fiber optic cable to move towards the retractable optical fiber assembly 20 (i.e., towards a retracted position) while maintaining the position of the first end 30 relative to the retractable optical fiber assembly 20.

Conversely, rotating the second ring 24 in a second direction B (i.e., generally opposite to the direction A), as shown in FIGS. 1 and 3, causes the second winding 28 of the fiber optic cable to unwind about the second ring 24 thereby extending the second end 32 from the retractable optical fiber assembly 20. As the second end 32 extends outwards via the second base passage 42, a reduced amount of the second winding 28 is disposed in the interior 64 of the base 34. At the same time, the first winding 26 winds onto the first ring 22 thereby retaining the first end 30 in a generally stable position as the second end 32 is extended. The first winding 26 tends to tighten within the area 66 generally towards the periphery of the first ring 22 as it winds onto the first ring 22.

As described herein, the fiber optic cable can be a single, continuous fiber optic cable. Thus, the retractable optical fiber assembly 20 can include the various passages 40, 42, 50 to be able to thread the single cable therethrough. Specifically, the first base passage 40 can provide communication between the area 66 between the first and second rings 22, 24 and an exterior of the base 34. Similarly, the second base passage 42 can provide communication between the interior 64 of the base 34 and the exterior of the base 34. Further, the ring passage 50 can provide communication between the area 66 between the first and second rings 22, 24, and the interior 64 of the base 34. Thus, the first winding 26 can be threaded through the first base passage 40 with a length of the first winding 26 configured to be disposed in the area 66 between the first and second rings 22, 24. At the same time, the second winding 28 can be threaded through the second base passage 42 with a length of the second winding 28 configured to be disposed in the interior 64 of the base 34.

In one example, any or all of the passages 40, 42, 50 can be apertures extending through at least a portion of the side wall 36, circumferential wall 38, and second ring 24, respectively. In another example, any or all of the passages 40, 42, 50 can be provided as gaps or separations between various elements. For example, the second base passage 42 can be provided as a gap or separation between portions of the base 34 and the spool 46. In addition or alternatively, either or both of the base 34 and spool 46 can be provided with additional structure to inhibit, such as prevent, binding or damage to the fiber optic cable, and/or facilitate extension or retraction thereof, during the "counter coiling" operations. For example, any or all of the passages 40, 42, 50 can be provided with structure to inhibit, such as prevent, binding, snagging, rubbing, tangling, knotting, or other damage to the fiber optic cable as it passes therethrough. Similarly, any or all of the passages 40, 42, 50 can be provided with structure to directionally guide the cable to facilitate extension or retraction thereof, and/or structure adapted to inhibit the cable from exceeding its minimum bend radius.

Because the first winding is disposed generally within the area 66 between the first and second rings 22, 24, and the second winding is disposed generally within the interior 64 of the base 34, the single fiber optic cable can pass through the ring passage 50 to transition between the interior 64 and the area 66. For example, the ring passage 50 can be provided as a portion of the second ring 24. Moreover, to facilitate the "counter-coil" arrangement, it can be beneficial to fix the ratio of the lengths of the first and second windings 26, 28. Thus, the intermediate location 62 of the fiber optic cable can be secured to the spool 46 with respect to the ring passage 50. The intermediate location 62 can be removably or non-removably secured to the spool 46 in various manners, including mechanical fasteners, adhesives, welding, etc.

As discussed previously herein, the first and second windings 26, 28 can have various relative lengths. The first and second windings 26, 28 can have generally equal lengths, or even unequal lengths, such as where the second winding 28 can be greater than the first winding 26. Generally, a ratio of the lengths of the first and second windings 26, 28 can be adjusted to accommodate various amounts, sizes, and/or geometries of the fiber optic cable. For example, the first ring 22 can define a first circumference about an outer boundary thereof, and the second ring 24 can define a second circumference about an outer boundary thereof. While the first and second rings 22, 24 are illustrated as having a generally circular geometry defining a generally circular circumference, either or both of the rings 22, 24 can have various other geometries so as to define various circumferences about the outer boundaries thereof. Thus, the first winding 26 can define a first predetermined length of cable to be wound about the circumference of the first ring 22, while the second winding 28 can defined a second predetermined length of cable to be wound about the circumference of the second ring 24. Because the second ring 24 rotates relative to the first ring 22, the amount of fiber optic cable that can be stored by the retractable optical fiber assembly 20 can be at least partially determined by a ratio of the first and second circumferences.

For example, a ring ratio can be defined as the second circumference divided by the first circumference (i.e., the circumference of the second ring 24 divided by the circumference of the first ring 22). Similarly, a length ratio can be defined as the second predetermined length divided by the first predetermined length (i.e., the length of the second winding 28 divided by the length of the first winding 26). It is to be understood that while various lengths of fiber optic cable can be wound about either of the first and second rings 22, 24, it can be beneficial to have a sufficient amount of fiber optic cable available for winding and unwinding about the first ring 22 such that the extension or retraction of the second end 32 of the fiber optic cable is not inhibited, such as prevented.

Thus, a comparison of the ring ratio to the length ratio can at least partially determine the amount of fiber optic cable that can be stored by the retractable optical fiber assembly 20. In one example, the ring ratio can be generally equal to the length ratio. Stated another way, when the second winding 28 is substantially fully unwound from the second ring 24, the first winding 26 is substantially fully wound about the first ring 22. In another example, the ring ratio can be greater than the length ratio. Stated another way, as illustrated in FIG. 1, when the second winding 28 is substantially fully unwound from the second ring 24, the first winding 26 is only partially wound about the first ring 22. Thus, the coiling action of the first winding 26 onto the first ring 22 generally should not inhibit the un-coiling action of the second winding 28 from the second ring 24.

However, where the ring ratio is less than the length ratio, an insufficient amount of fiber optic cable for winding and unwinding about the first ring 22 may inhibit, such as prevent, the un-coiling action of the second winding 28 from the second ring 24. For example, the extension or retraction of the second end 32 of the fiber optic cable can be inhibited. In other words, where a relatively greater amount of cable is wound about the second ring 24, rotation of the second ring 24 may be inhibited by a relatively lesser amount of cable wound about the first ring 22. Specifically, where the first winding 26 is substantially fully wound about the first ring 22, it can bind and inhibit further rotation of the second ring 24. Still, such a scenario may be beneficial, such as to limit the extension of the second end 32 of the fiber optic cable, such as to reduce stress and/or strain on the various elements of the retractable optical fiber assembly 20, including on the cable itself.

It is to be understood that because the system is an active, rotating system, a comparison of the ring and length ratios can similarly determine a total number of turns or revolutions the second ring can make. However, where an amount of the cable is increasingly wound about the spool, the overall effective circumference of the spool may increase due to a stacking effect of the cable. Moreover, various other factors can also at least partially determine the amount of fiber optic cable usable with the retractable optical fiber assembly 20, such as the relative size and/or geometry of the various elements, the size (i.e., diameter) of the fiber optic cable, the stiffness of the fiber optic cable, etc. For example, various diameter fiber optic cables can be utilized, such as diameters of 1.65 mm, 2.0 mm, and/or 2.9 mm, though various other diameters are also contemplated.

In addition or alternatively, the retractable optical fiber assembly 20 can also include various other components. In one example, the assembly 20 can include a ratcheting member 68 adapted to selectively permit rotation of the spool 46. It can be beneficial to use a ratcheting member 68 to complement the biasing effect provided by a resilient member 58. For example, the ratcheting member 68 can be adapted to permit rotation of the spool 46 in the second direction (i.e., along the direction of arrow B of FIG. 1), while selectively inhibiting rotation of the spool 46 in the first direction (i.e., along the direction of arrow A of FIG. 2). In other words, the ratcheting member 68 can be adapted to permit extension of the second end 32 of the cable, while selectively inhibiting retraction of the second end 32, though the spool 46 can be otherwise resiliently biased towards rotation. Still, it is to be understood that the ratcheting member 68 can be adapted to permit rotation of the spool 46 in the various directions.

Figure 9:
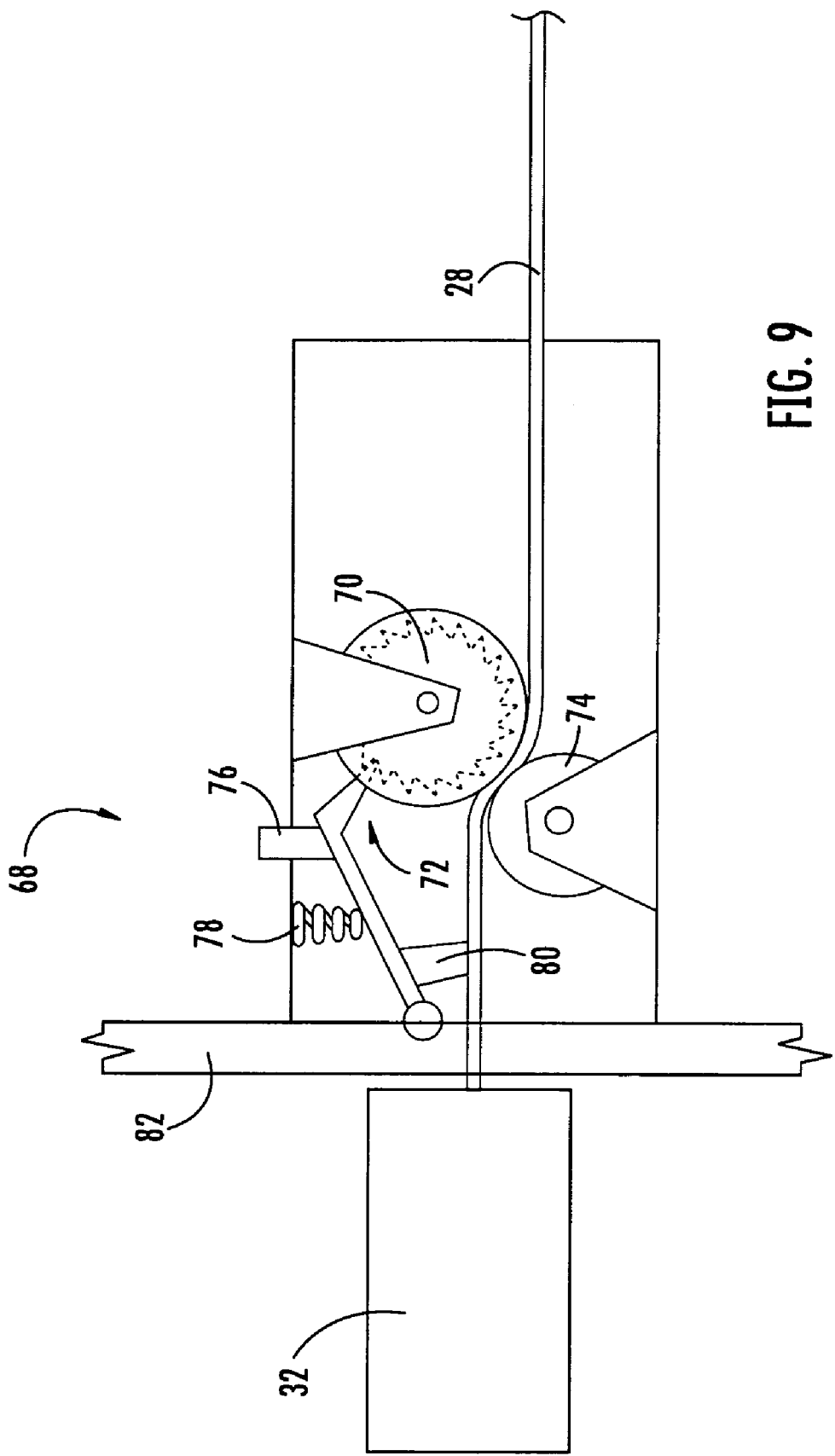
FIG. 9 illustrates an example ratcheting member according to another aspect of the present invention.

Various ratcheting members 68 can be utilized and located variously about the retractable optical fiber assembly 20. In one example, as illustrated in FIG. 9, the ratcheting member 68 can include a ratchet wheel 70 having ratchet teeth in engagement with a pawl 72 for selectively inhibiting rotation of the spool 46. As shown, a portion of the second winding 28 can ride against and cause the ratchet wheel 70 to rotate. In addition or alternatively, the ratcheting member 68 can also include an idler wheel 74 or the like. The ratcheting member 68 can also include various other elements, such as an activation lever or button 76, a resilient member 78, and/or a cable guide 80. The cable guide 80 can further include brake or damper structure to slow the retraction speed of the second winding 28 back onto the second ring 24 when the ratcheting member 68 is released. The ratcheting member 68 can be located variously about the retractable optical fiber assembly 20, such as on a portion 82 of the base 34.

In another example (not shown), the ratcheting member can include a resilient clamp or the like adapted to selectively and at least partially clamp a portion of the second winding 28 to selectively inhibit rotation of the spool 46. For example, a portion of the second winding 28 could be selectively clamped between a selectively operable, spring-biased clamping member and a clamp base, though various additional and/or different elements can also be used. In yet another example (not shown), the ratcheting member can be similar that the structure disclosed in FIGS. 6-7 of U.S. Pat. No. 6,915,058, assigned to Corning Cable Systems LLC, the disclosure of which is incorporated herein by reference.

Though the "counter-coil" arrangement is described herein with a single, continuous fiber optic cable, it is to be understood that the retractable optical fiber assembly 20 can include a plurality of fiber optic cables that are optically coupled together. For example, the first winding 26 can include a first fiber optic cable, and the second winding 28 can include a second, separate fiber optic cable. The first and second fiber optic cables can be optically connected to each other, such as about the ring passage 50 or at various other locations. In another example, either or both of the first and second ends 30, 32 can be configured to be optically coupled to a separate optical cable.

Figure 12:
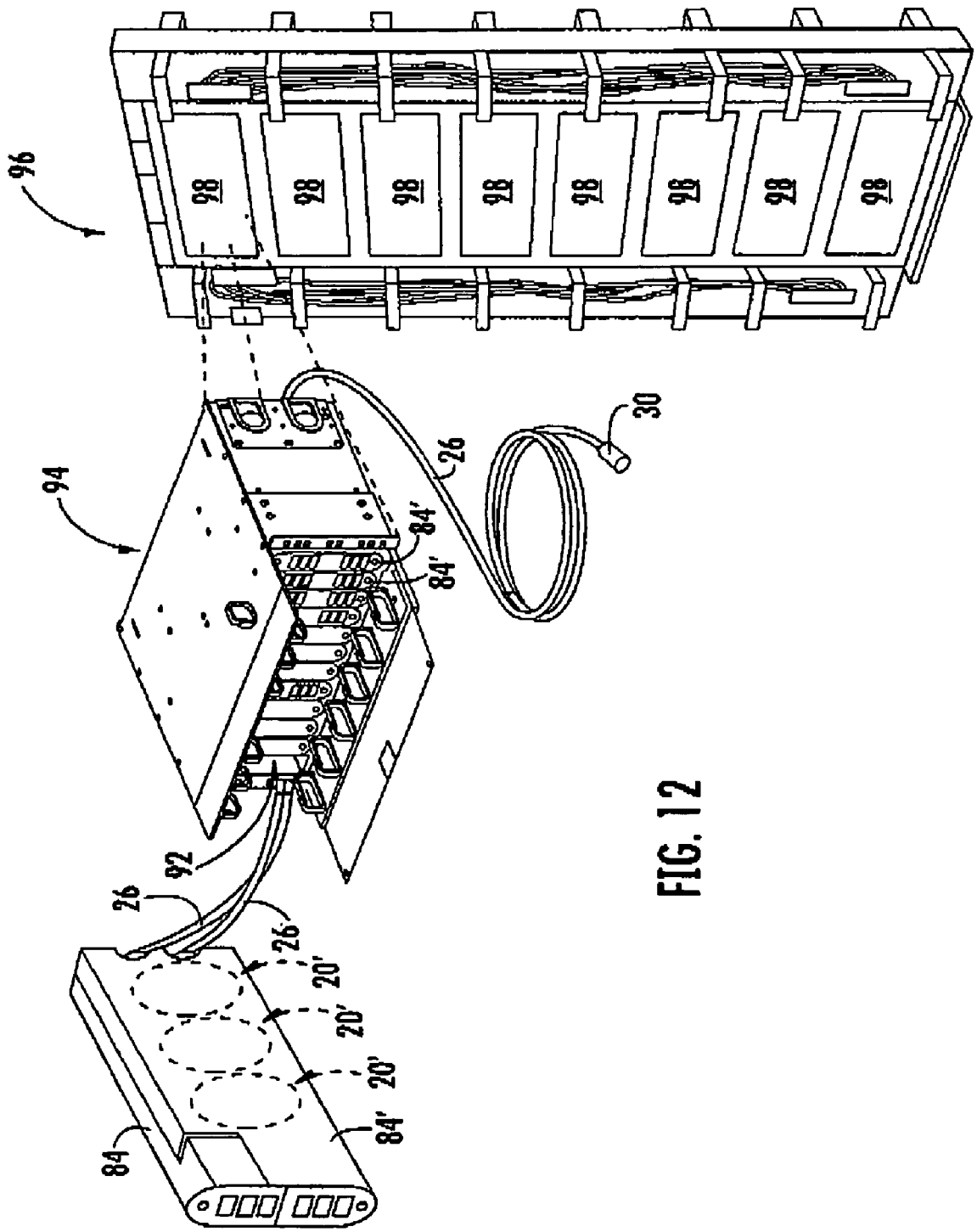
FIG. 12 illustrates the pair of nested modules of FIG. 11 for use in an example housing that is adapted for use in an example equipment rack according to another aspect of the present invention.

Referring now to FIGS. 10-12, yet another aspect of the present invention will now be described. Though generally described herein as including a single spool 46 coupled to a single base 34, the retractable optical fiber assembly 20 can be a portion of a module 84 having a plurality of spools 46. For example, one or more base(s) 34 and spool(s) 46 can be coupled to, such as mounted to, a single module 84. Indeed, in a single module 84, each base 34 and spool 46 can be one of a plurality of bases 34 and spools 46. For example, as shown in FIG. 10, a plurality of modules 84, 84' are shown, each of which includes a plurality of bases 34, 34' and spools 46, 46'. Each of the plurality of bases 34, 34' can include a first ring 22, and each of the plurality of spools 46, 46' can include a second ring 24. A plurality of fiber optic cables can each be associated with a respective one of the plurality of spools 46, 46', and can each include first ends 30, 30' and second ends 32, 32' disposed adjacent first faces 86, 86' and second faces 88, 88', respectively, of the module 84, 84'. Additionally, because each of the plurality of spools 46, 46' can be rotatable with respect to a respective one of the plurality of bases 34, 34', rotation of a selected one of the spools 46, 46' relative to an associated base 34, 34' can selectively permit extension or retraction of an associated second end 32, 32'. As before, the first ends 30, 30' can remain in a generally stable position. Further, each of the plurality of base 34, 34' and spool 46, 46' arrangements can be independently operable to permit selective and independent extension or retraction of any or all of the second ends 32, 32' from the module 84, 84'. Still, some of all of the base and spool arrangements can also be simultaneously operable through various manners, such as a master-slave driving configuration or the like.

Though described as each module 84, 84' having a plurality of bases 34, 34' and a plurality of spools 46, 46', it is to be understood that the structure of the module 84, 84' itself can form the bases 34, 34'. In other words, a portion of the module 84, 84', such as a side wall or the like, can include the plurality of bases 34, 34'. For example, any or all of the plurality of first rings 22, side walls 36, first and second base passages 40, 42, etc. can be formed with a portion of the module 84, 84'. Indeed, a portion of the module 84, 84' can be formed, such as molded, as a monolithic element containing the various components of the plurality of bases 34, 34'. Thus, to assemble the plurality of retractable optical fiber assemblies 20, 20' of a single module 84, 84', a plurality of spools 46, 46' can be coupled to the module 84, 84' about the associated elements of the plurality of bases 34, 34'. As a result, a plurality of retractable optical fiber assemblies 20 can be conveniently provided in a relatively efficient package.

Moreover, two or more of the modules 84, 84' can be configured to be nested together so as to relatively increase the density of retractable optical fiber assemblies 20, 20'. For example, as shown in FIGS. 11-12, a pair of modules 84, 84' can be nested together such that corresponding geometries 90 thereof can be coupled together. Either or both of the modules 84, 84' can include structure to maintain the modules 84, 84' in a nested configuration, such as various mechanical fasteners or the like. In addition or alternatively, various adhesives, welding, etc. can also be used to maintain the nested configuration. In addition or alternatively, though shown and described as a pair of nested modules, a single module could include a diverse number of retractable optical fiber assemblies 20, 20', such as the six shown.

Additionally, to generally conserve space and/or facilitate usage of a plurality of nested modules 84, 84' within a housing or rack assembly, the modules 84, 84' can be configured occupy maximum dimensions when in a nested configuration. For example, one of the modules 84' can define a maximum width $W_1$, such as a width of a second face 88'. The width of the second face 88' can correspond generally to a width of a receptacle opening 92 of a housing 94. When nested, the modules 84, 84' can collectively define a total width $W_2$ such that the total width $W_2$ is equal to or less than the maximum width $W_1$. Thus, because the total width $W_2$ of the nested modules 84, 84' can be less than the width of a receptacle opening 92 of a housing 94, each nested pair of modules 84, 84' can be easily inserted and removed from the housing 94.

As a result, the housing 94 can accommodate a relatively large number of modules 84, 84' so as to provide a relatively high density of retractable optical fiber assemblies 20, 20'. Moreover, where the width of the receptacle openings 92 is generally standardized, a housing 94 can also accommodate various other types of modules for supporting various other types of equipment, such as various other types of fiber optic communication equipment or the like. In addition or alternatively, to further increase the density, each of a plurality of housings 94 can be maintained within an equipment rack 96 having a plurality of mounting positions 98.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A retractable optical fiber assembly, including:
   a base having a first ring;
   a spool having a second ring, wherein the spool is rotatable with respect to the base; and
   a length of fiber optic cable including a first end, a second end, and an intermediate location, the fiber optic cable including a first cable portion defined between the first end and the intermediate location, and a second cable portion defined between the second end and the intermediate location, and
   wherein the intermediate location is coupled to the spool, and
   wherein rotation of the spool with respect to the base in a first direction causes the first cable portion to unwind about the first ring while the second cable portion winds onto the second ring.

2. The retractable optical fiber assembly of claim 1, wherein rotation of the spool with respect to the base in a second direction causes the second cable portion to unwind about the second ring while the first cable portion winds onto the first ring.

3. The retractable optical fiber assembly of claim 1, further including a resilient member positioned between the base and the spool to bias the spool towards the first direction.

4. The retractable optical fiber assembly of claim 1, further including a ratcheting member adapted to permit rotation of the spool in a second direction, and selectively inhibit rotation of the spool in the first direction.

5. The retractable optical fiber assembly of claim 1, wherein the second ring includes a ring passage adapted to permit the fiber optic cable to extend therethrough, wherein the intermediate location is secured to the spool with respect to the ring passage.

6. The retractable optical fiber assembly of claim 1, wherein the first ring defines a first circumference and the second ring defines a second circumference, wherein a ring ratio is defined as the second circumference divided by the first circumference, and a length ratio is defined as second predetermined length defined by the second cable portion divided by a first predetermined length defined by the first cable portion, and
   wherein the ring ratio is equal to or greater than the length ratio.

7. The retractable optical fiber assembly of claim 1, further including a side wall that at least partially circumscribes the second ring.

8. The retractable optical fiber assembly of claim 1, further including a module, wherein the base and the spool are mounted in the module.

9. The retractable optical fiber assembly of claim 8, wherein the base is one of a plurality of bases and the spool is one of a plurality of spools.

10. The retractable optical fiber assembly of claim 8, wherein the module comprises a pair of modules adapted to be nested together.

11. The retractable optical fiber assembly of claim 10, wherein the first end of the first optical fiber cable is capable of connecting to a terminal panel.

12. A retractable optical fiber assembly, including:
    a base having a first ring, a side wall, and first and second base passages;
    a spool having a second ring and a ring passage, wherein the spool is rotatable with respect to the base; and
    a length of fiber optic cable coiled onto the second ring and including a first end, a second end, and an intermediate location, the fiber optic cable including a first cable portion defined between the first end and the intermediate location, and a second cable portion defined between the second end and the intermediate location,
    wherein the first base passage provides communication between an area between the first and second rings and an exterior of the base, the second base passage provides communication between an interior of the base and the exterior of the base, and the ring passage provides communication between the area between the first and second rings and the interior of the base, and
    wherein the first cable portion is threaded through the first base passage with a length of the first cable portion configured to be disposed in the area between the first and second rings, the second cable portion is threaded through the second base passage with a length of the second cable portion configured to be disposed in the interior of the base, and the intermediate location is secured to the spool with respect to the ring passage.

13. The retractable optical fiber assembly of claim 12, wherein the base includes an aperture and the spool includes at least one resilient arm adapted to be received by the aperture, and wherein the spool is rotatable with respect to the base about the at least one resilient arm.

14. The retractable optical fiber assembly of claim 13, further including a resilient member positioned between the base and the spool to bias the spool towards a first direction.

15. The retractable optical fiber assembly of claim 14, wherein the at least one resilient arm includes a pair of resilient arms, and wherein a portion of the resilient member is coupled to the spool between the pair of resilient arms.

16. The retractable optical fiber assembly of claim 12, wherein rotation of the spool in a first direction with respect to the base causes the first cable portion to unwind about the first ring while the second cable portion winds onto the second ring.

17. The retractable optical fiber assembly of claim 12, wherein rotation of the spool with respect to the base in a second direction causes the first cable portion to wind onto the first ring while the second cable portion unwinds about the second ring.

18. The retractable optical fiber assembly of claim 12, further including a ratcheting member adapted to permit rotation of the spool in a second direction, and selectively inhibit rotation of the spool in a first direction.

19. The retractable optical fiber assembly of claim 12, wherein the retractable optical fiber assembly is a portion of a module having a plurality of spools.

20. The retractable optical fiber assembly of claim 19, wherein a pair of modules are adapted to be nested together.

21. A retractable optical fiber assembly, including:
a base having a first ring defining a first circumference;
a spool having a second ring defining a second circumference, wherein the spool is rotatable with respect to the base; and
a length of fiber optic cable including a first cable portion defining a first predetermined length of cable adapted to be wound about the first ring, and a second cable portion defining a second predetermined length of cable adapted to be wound about the second ring,
wherein a ring ratio is defined as the second circumference divided by the first circumference, and a length ratio is defined as the second predetermined length divided by the first predetermined length, and
wherein the ring ratio is equal to or greater than the length ratio.

22. The retractable optical fiber assembly of claim 21, wherein rotation of the spool in a first direction with respect to the base causes the first cable portion to unwind about the first ring while the second cable portion winds onto the second ring, and
wherein rotation of the spool in a second direction with respect to the base causes the first cable portion to wind onto the first ring while the second cable portion unwinds from the second ring.

23. The retractable optical fiber assembly of claim 22, further including a resilient member positioned between the base and the spool to bias the spool towards the first direction.

24. The retractable optical fiber assembly of claim 21, wherein the fiber optic cable has a first end, a second end, and an intermediate location, the first cable portion being defined between the first end and the intermediate location, and the second cable portion being defined between the second end and the intermediate location.

25. The retractable optical fiber assembly of claim 24, wherein the intermediate location of the fiber optic cable is secured to the spool.

26. The retractable optical fiber assembly of claim 21, wherein the retractable optical fiber assembly is a portion of a module having a plurality of spools.

27. The retractable optical fiber assembly of claim 26, wherein a pair of modules are adapted to be nested together.

28. A module including a plurality of retractable optical fiber assemblies, including:
a plurality of bases, each base having a first ring;
a plurality of spools each having a second ring, wherein each of the plurality of spools is rotatable with respect to a respective one of the plurality of bases; and
a plurality of fiber optic cables each including a first cable portion and a second cable portion, wherein each of the plurality of fiber optic cables is associated with a respective one of the plurality of spools,
wherein rotation of a selected one of the plurality of spools in a first direction with respect to an associated base causes the first cable portion of the associated fiber optic cable to unwind about an associated first ring while the second cable portion of the associated fiber optic cable winds onto the second ring of the selected one of the plurality of spools.

29. The module of claim 28, wherein each of the plurality of spools are independently rotatable with respect to the base so as to independently wind the second cable portion of each associated fiber optic cable onto a respective spool.

30. The module of claim 28, wherein the first cable portion of each fiber optic cable is threaded through at least one base passage such that a length of each first cable portion configured to be disposed exterior of the base, and wherein each first cable portion disposed exterior of the base is configured to remain substantially fixed relative to the base independent of rotation of an associated spool relative to the base.

31. The module of claim 28, further including a plurality of modules, wherein at least two of modules are adapted to be nested together.

32. The module of claim 29, wherein one of the nested modules defines a maximum width, wherein the nested modules collectively define a total width, and wherein the total width is equal to or less than the maximum width.

33. A retractable optical fiber assembly, including:
a first ring, wherein the first ring is adapted to accommodate a first winding of a fiber optic cable having a first end;
a second ring positioned concentrically with the first ring, wherein the second ring is rotatable with respect to the first ring, and wherein the second ring is adapted to accommodate a second winding of the fiber optic cable having a second end, and
wherein rotating the second ring in a first direction causes the fiber optic cable to wind onto the second ring thereby retracting the second end towards the retractable optical fiber assembly, and causes the fiber optic cable to unwind about the first ring thereby retaining the first end in a stable position as the second end is retracted.

34. The retractable optical fiber assembly of claim 33, wherein rotating the second ring in a second direction causes the fiber optic cable to unwind about the second ring thereby extending a second end of the fiber optic cable from the retractable optical fiber assembly, and causes the fiber optic cable to wind onto the first ring thereby retaining a first end of the fiber optic cable in a stable position as the second end is extended.

35. The tractable optical fiber assembly of claim 33, wherein the first winding and the second winding wind in opposite directions.

36. The retractable optical fiber assembly of claim 33, further including a resilient member, wherein the resilient member biases the second ring to rotate in a second direction.

37. The retractable optical fiber assembly of claim 33, further including a ratcheting member adapted to permit rotation of the second ring in a second direction, and selectively inhibit rotation of the second ring in the first direction.

* * * * *

UNITED STATES PATENT AND TRADEMARK OFFICE
CERTIFICATE OF CORRECTION

PATENT NO. : 7,680,386 B2  Page 1 of 1
APPLICATION NO. : 12/220289
DATED : March 16, 2010
INVENTOR(S) : William Carl Hurley et al.

It is certified that error appears in the above-identified patent and that said Letters Patent is hereby corrected as shown below:

| *Col.* | *Line* | *Description* should read, |
|---|---|---|
| 15 | 1 | The retractable optical fiber assembly of claim 33, |

Signed and Sealed this
Sixth Day of December, 2011

David J. Kappos
*Director of the United States Patent and Trademark Office*